July 8, 1969 H. V. TYLER ET AL 3,454,789
PULSE HEIGHT SENSOR
Filed Jan. 27, 1966
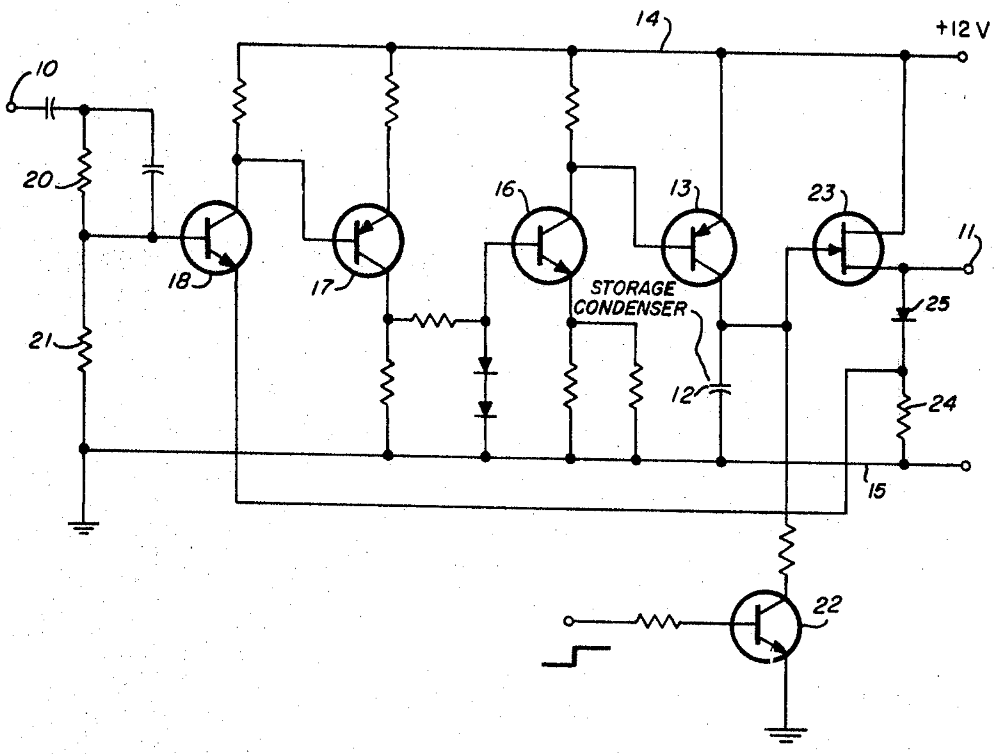
INVENTORS
HOWARD V. TYLER
RICHARD L. GOWAN
BY
ATTORNEYS United States Patent Office 3,454,789
Patented July 8, 1969

3,454,789
PULSE HEIGHT SENSOR
Howard V. Tyler, San Diego, and Richard L. Gowan, Coronado, Calif., assignors to the United States of America as represented by the Secretary of the Navy
Filed Jan. 27, 1966, Ser. No. 523,461
Int. Cl. H03k 5/20
U.S. Cl. 307—235 1 Claim This invention relates to pulse amplitude measuring system. The object of this invention is to provide a small compact converter which will generate a direct current voltage the amplitude of which is analagous to the height of applied pulse or alternating current voltages.

The attainment of such a simple object becomes less obvious when pulses of a few nanoseconds ($1\times10^{-8}$ seconds) are to be measured. As the energy content of the pulse approaches zero, the conventional technique of charging a condenser and measuring tht voltage across the condenser becomes unreliable. The minute charge of nanosecond pulses are dissipated in the input circuit of a voltmeter of even the highest impedance.

The pulse amplitude measuring circuits of this invention employ a special amplifier between the pulse source and the condenser to be charged. The input circuit of the special amplifier is biased by a direct current voltage fed back from the condenser to establish a threshold. For incoming pulses to pass the amplifier, and contribute to the condenser charge, the pulses must exceed in amplitude this threshold. Ample power is applied by the amplifier to hold the charge on the condenser against the ceiling established by the threshold voltage.

Other objects and features of the present invention will become apparent to those skilled in the art by referring to the specific embodiment of the invention described in the following specification and shown in the accompanying in which the single figure shows a schematic diagram of that embodiment.

It is contemplated that input terminal 10 will be connected to a point in a pulse circuit, the amplitude of the pulses of which art to be measured. Pulse test points may be found in many places throughout such pulse handling equipment as radar and computers. At the output terminal 11 appears a direct current voltage which is accurately representative of the amplitude fo the pulses applied at the input. One system in which this invention will be used is in the automatic test system more fully described in copending application, Ser. No. 494,990, filed Oct. 11, 1965. In that system the direct current voltage at terminal 11 is converted back to a series of pulses the frequency of which is analagous to the direct current votlage, which is in turn analogous to the amplitude of the raw pulse at terminal 10.

Condenser 12 for storing the incoming pulses to be measured may be of any size, and as expected should be of low leakage. Power for charging the condenser 12 is supplied from bus bars 14 and 15 through the transistor amplifier switch 13. In the embodiment shown bus bar 14 is positive with respect to bus bar 15, which may be at ground if desired, and transistor 13 is of the PNP type.

The emitter-collector path of transistor 13 is driven between the lower impedance of the conducting state and the high impedance of the cut-off state by the amplifiers 16, 17 and 18 connected in cascade between the base of transistor 13 and the input terminal 10. It may be found convenient to normalize the incoming pulses to an optimum level by the voltage divider resistances 20 and 21.

According to an important feature of this invention the first amplifier 18 of the series is biased by a threshold voltage on one of the input electrodes of the amplifier. The threshold voltage is established by the attained voltage across the storage condenser 12. This means that the incoming pulse to be passed by the amplifiers to contribute to the condenser charge must exceed the threshold bias on amplifier 18. It is apparent then that the charge on condenser 12 will always push against a ceiling established by the incoming pulses themselves. That is, as the amplitude of the incoming pulses rise the voltage across condenser 12 corresponding rises. The condenser voltage decay between pulses may be made negligible by proper leakage control.

Since the negative feedback from the condenser to the amplifier responds only to a pulse series of ascending voltages, means must be provided for discharging the condenser. For this purpose the condenser is short-circuited at regular or irregular intervals by the switching transistor 22.

To minimize the loading of the read-out circuit on the storage condenser, the high impedance of the gate circuit of the field effect transistor 23 is employed. This transistor comprises three electrodes; the source, drain, and gate. The voltage on the gate effects the current between the drain and source without noticeably diminishing the near infinite impedance of the gate circuit. Load resistor 24 in the source circuit of transistor 23 is also in the emitter circuit of amplifier 18. With some types of field effect transistors, it is desirable to connect the diode 25, also in the load circuit of transistor 23, to drop the output voltage a uniform amount to approximate the voltage across condenser 12. The polarities of the elements in the feedback circuit thus established are such that the direct current signal fed back is degenerative with respect to the incoming pulses.

Assume a train of positive pulses at input terminal 10. Each pulse is amplified successively by transistors 18, 17 and 16 which drives the base of transistor 13, causing transistor 13 to partially charge capacitor 12 for each pulse input. The accumulating charge in condenser 12 is sampled by the field effect transistor 23 and is repeated at output terminal 11. The lower end of diode 25 repeats the output voltage at 11 but at approximately a two volt lower level in one embodiment. This voltage is proportional to the charge on condenser 12 and is fed back to the emitter of the input transistor 18. As the voltage at the emitter of transistor 18 approaches the amplitude of the incoming pulses, transistor 18 shuts off. The charge on condenser 12, repeated at 11, is now analogous to the input pulse amplitude. The output voltage at 11 may be higher than the voltage on condenser 12 because of the source voltage of field effect transistor 23. This voltage varies with different field effect transistors but is usually approximately two volts DC. This additional minimum voltage level is stable and does not produce undesirable effects since the voltage-to-frequency device to which this device may be connected can effectively use the small DC voltage level for zero signal indications.

Absolute values and linearity of the circuits of this device are not important since good repeatability of readings is obtained.

Obviously many modifications and variations of the present invention are possible in the light of the above teachings. It is therefore to be understood that within the scope of the appended claims the invention may be practiced otherwise than as specifically described.

What is claimed is:

1. The combination in a system for generating a steady direct current potential proportional to the peak amplitude of a series of pulses, said system comprising;

a storage condenser, an amplifier having a control electrode connected to the pulse source to be measured, an output electrode coupled to charge said condenser, and a common electrode, a field effect transistor with a gate, a drain, and a source electrode, said gate electrode being connected to one terminal of said storage condenser, a diode and a load resistor connected in series between said source electrode and the other terminal of said condenser so that the junction of the diode and resistor is representative of the voltage across said condenser, a connection from said junction and the common electrode of said amplifier for establishing a threshold bias above which a pulse must rise to unblock the amplifier, and a transistor switch connected across said terminals of said storage condenser for repetitiously discharging to zero the charge of the condenser.

References Cited

UNITED STATES PATENTS

| | | | |
|---|---|---|---|
| 2,854,630 | 9/1958 | Fogelberg ---------- | 328—115 |
| 3,073,968 | 1/1963 | Tribby ------------ | 328—115 |
| 3,145,345 | 8/1964 | Squillaro et al. ------- | 330—88 |
| 3,262,061 | 7/1966 | Kahn -------------- | 330—28 |
| 3,259,760 | 7/1966 | Morey et al. -------- | 328—115 |
| 3,292,013 | 12/1966 | Golahny ----------- | 307—304 |
| 3,328,605 | 6/1967 | Eubanks ----------- | 328—150 |

ARTHUR GAUSS, *Primary Examiner.*

H. A. DIXON, *Assistant Examiner.*

U.S. Cl. X.R.

307—246, 304